(12) United States Patent
Fan et al.

(10) Patent No.: US 8,923,919 B2
(45) Date of Patent: *Dec. 30, 2014

(54) METHOD AND SYSTEM FOR INTERACTIVE HOME MONITORING

(71) Applicant: AT&T Intellectual Property I, L.P., Atlanta, GA (US)

(72) Inventors: James W. Fan, San Ramon, CA (US); Richard Kuo, Mountain View, CA (US); Jennifer K. Lam, Fremont, CA (US)

(73) Assignee: AT&T Intelletual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,524

(22) Filed: Jun. 2, 2014

(65) Prior Publication Data

US 2014/0282752 A1    Sep. 18, 2014

Related U.S. Application Data

(63) Continuation of application No. 12/848,768, filed on Aug. 2, 2010, now Pat. No. 8,744,523.

(51) Int. Cl.
*H04M 1/00* (2006.01)
*H04N 21/41* (2011.01)
*H04N 21/61* (2011.01)
*H04N 21/643* (2011.01)

(52) U.S. Cl.
CPC ....... *H04N 21/4131* (2013.01); *H04N 21/6181* (2013.01); *H04N 21/64322* (2013.01)
USPC ................... 455/556.1; 340/539.11; 340/541

(58) Field of Classification Search
USPC ........ 455/556.1; 340/539.11, 539.14, 539.23, 340/541
See application file for complete search history.

(56) References Cited

U.S. PATENT DOCUMENTS

| 4,644,320 | A | 2/1987 | Carr et al. |
|---|---|---|---|
| 7,242,305 | B2 | 7/2007 | Cuddihy et al. |
| 7,391,754 | B2 | 6/2008 | Bae et al. |
| 7,414,516 | B2 | 8/2008 | Yoon et al. |
| 7,583,191 | B2 | 9/2009 | Zinser |
| 7,649,458 | B2 | 1/2010 | Mrazovich |
| 8,321,885 | B2 | 11/2012 | Pino et al. |
| 2001/0034586 | A1 | 10/2001 | Ewert et al. |
| 2002/0111698 | A1 | 8/2002 | Graziano et al. |
| 2004/0229569 | A1 | 11/2004 | Franz |
| 2005/0035855 | A1 | 2/2005 | Sarnowsky |
| 2005/0137465 | A1 | 6/2005 | Cuddihy et al. |
| 2005/0147049 | A1 | 7/2005 | Ganesan |
| 2005/0225426 | A1 | 10/2005 | Yoon et al. |
| 2005/0237179 | A1 | 10/2005 | Cuddihy et al. |
| 2006/0078309 | A1 | 4/2006 | Chen et al. |
| 2006/0084440 | A1 | 4/2006 | Bakri |
| 2006/0146703 | A1 | 7/2006 | Cha et al. |

(Continued)

*Primary Examiner* — Raymond Dean
(74) *Attorney, Agent, or Firm* — Jackson Walker L.L.P.

(57) ABSTRACT

A method and system for interactive home monitoring includes detecting a visitor arriving at a premises of a multimedia content distribution network (MCDN) client by an intercom unit installed at the premises. The intercom unit may be coupled to the MCDN client, which may be configured to wirelessly communicate with a user of the MCDN client. A captured image of the visitor may be used to determine if an identity of the visitor is known or unknown. Based on the identity, a communication channel between the visitor and the user may be established at the intercom unit. The intercom unit may further be configured to provide further information to the visitor based on the visitor identity.

18 Claims, 7 Drawing Sheets

(56) References Cited

U.S. PATENT DOCUMENTS

| | | |
|---|---|---|
| 2006/0158336 A1 | 7/2006 | Nourbakhsh et al. |
| 2006/0261961 A1 | 11/2006 | Tice |
| 2007/0090944 A1 | 4/2007 | DuBreuil |
| 2008/0055109 A1 | 3/2008 | Freathy et al. |
| 2008/0102870 A1 | 5/2008 | Gothard et al. |
| 2008/0129821 A1 | 6/2008 | Howarter et al. |
| 2008/0190639 A1 | 8/2008 | Baran et al. |
| 2008/0298572 A1 | 12/2008 | Rondeau et al. |
| 2009/0055216 A1 | 2/2009 | Inaba et al. |
| 2009/0131763 A1 | 5/2009 | Taylor et al. |
| 2009/0196464 A1 | 8/2009 | Dimitrova et al. |
| 2009/0225750 A1 | 9/2009 | Hawkins |
| 2010/0136958 A1 | 6/2010 | Chandra et al. |
| 2010/0277302 A1 | 11/2010 | Cohn et al. |
| 2010/0277315 A1 | 11/2010 | Cohn et al. |
| 2010/0280635 A1 | 11/2010 | Cohn et al. |
| 2011/0030016 A1 | 2/2011 | Pino, Jr. |
| 2011/0071656 A1 | 3/2011 | McKiel, Jr. |
| 2011/0093907 A1 | 4/2011 | Ospalik et al. |

METHOD AND SYSTEM FOR INTERACTIVE HOME MONITORING

The present patent application is a continuation of a previously filed patent application, U.S. patent application Ser. No. 12/848,768, filed Aug. 2, 2010, the entirety of which is hereby incorporated by reference. Pursuant to 37 CFR §1.78(a)(3), an application data sheet containing a reference to the previously filed application, unless submitted previously, is submitted contemporaneously herewith.

FIELD OF THE DISCLOSURE

The present disclosure relates to home monitoring and, more particularly, to interactive home monitoring using wireless telemetry.

BACKGROUND

Typical home security systems may provide monitoring and control services via a residential gateway and may depend upon a fixed network connection to operate. Typical fixed network connections are susceptible to signal loss and/or disruption.

DESCRIPTION OF THE EMBODIMENT(S)

In one aspect, a disclosed method for providing interactive monitoring at a client premises of a multimedia content distribution network (MCDN) includes receiving, from an intercom unit, an arrival indication indicating a visitor in proximity to the intercom unit and determining an identity of the visitor based on a captured image of the visitor. The intercom unit is coupled via an intercom link to a multimedia handling device (MHD) at the client premises. The MHD may be or include a set top box (STB). The method may further include establishing, with a wireless interface of the MHD, a wireless bidirectional audio communication channel between the MHD and a mobile user device associated with an MCDN user of the client premises. The wireless bidirectional audio communication channel may be established based on the identity of the visitor. The method may also include extending the communication channel via the intercom link from the MHD to the intercom unit. The communication channel may extend to a mobile user device at a location that is remote from the client premises. The mobile user device may be a cellular telephone, a smart phone, a portable computer, a personal computer, or the like.

In certain embodiments, the communication channel between the MHD and the mobile user device may be established as a push-to-talk connection, while the method may further include recording an audio message from the visitor, and associating the recorded audio message with the identity of the visitor. Determining the identity may further include matching at least a portion of the captured image with a previously stored image. The matching may be a result of a biometric analysis of a facial image of the visitor. When the identity of the visitor is determined to be a new identity, the method may further include storing at least a portion of the captured image of the visitor. The method may further include receiving a request from the MCDN user for a visitor report for a specified period of time, sending the visitor report to the MCDN user, and providing the MCDN user access to stored images of the visitors. The visitor report may include arrival indications for visitors over the specified period of time.

In a further aspect, a disclosed MHD for interactively monitoring a client premises includes a processor coupled to memory media and a wireless telemetry interface accessible to the processor. The memory media may include processor instructions executable to detect a visitor in proximity of the client premises and determine an identity of the visitor based on an image received from an intercom unit in communication with the MHD via an intercom link, and receive, via the intercom unit, an arrival indication initiated by the visitor. The processor instructions may also be executable to enable an MCDN user to communicate with the visitor via the wireless telemetry interface. The MHD may further be configured to use the wireless telemetry interface as a backup network interface when the MCDN is unavailable. The wireless telemetry interface may include a cellular telephony interface. The cellular telephony interface may be provided by a cellular telephone device coupled to the processor. The intercom link may include at least one of: a wireless link, an optical link, and a galvanic link.

In particular embodiments, the MHD may further include a network connection to a home security monitor, while the memory media may further include processor instructions executable to receive, from the home security monitor, sensor status information for at least one security sensor installed at the client premises, and forward the sensor status information to the MCDN user. The memory media may further include processor instructions executable to receive control information from the MCDN user to control an actuator installed at the client premises, and forward the control information to the home security monitor. The memory media may still further include processor instructions executable to receive, from the home security monitor, activator status information indicating a state of the actuator, and forward the activator status information to the MCDN user.

In yet another aspect, a disclosed computer-readable memory media includes executable instructions for monitoring the premises associated with an MCDN client. The instructions may be executable to detect a visitor arriving at the client premises based on an image and/or audio date acquired by an intercom unit installed at the client premises. Based on a collection of stored visitor profiles and the acquired image and/or audio data, a determination of whether the visitor is known or unknown may be made. Based on the visitor determination, the instructions may be executable to output a visitor prompt using the intercom unit, while, when the visitor is known, the visitor prompt may be specific to a known visitor identity. When the visitor is detected and based on the visitor status, the instructions may be executable to establish a communication channel between the intercom unit and a network address associated with a user MCDN associated with the client.

In some embodiments, the memory media may further include instructions executable to receive, at the intercom unit, a request from the visitor for premises information, and responsive to the request, output, via the intercom unit, premises information to the visitor based on the visitor status. The intercom unit may be configured to output multimedia content, including at least one of: audio content, video content, images, and text. When the visitor is unknown, the instructions may be executable to add a new visitor profile, including the acquired image and/or audio data, for the visitor in the collection. The network address may include a cellular telephone number, while the communication channel may include a wireless telemetry channel. The network address may include an Internet-protocol address, while the communication channel may be established at least in part via the Internet. The memory media may further include instructions executable to use the communication channel to: notify the MCDN user that the visitor was detected, send the image and/or audio data to the MCDN user, send the visitor status to the MCDN user, communicate bidirectionally between the visitor and the MCDN user, communicate via audio, communicate via video, communicate via text, and/or receive instructions from the MCDN user for interfacing with the visitor.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
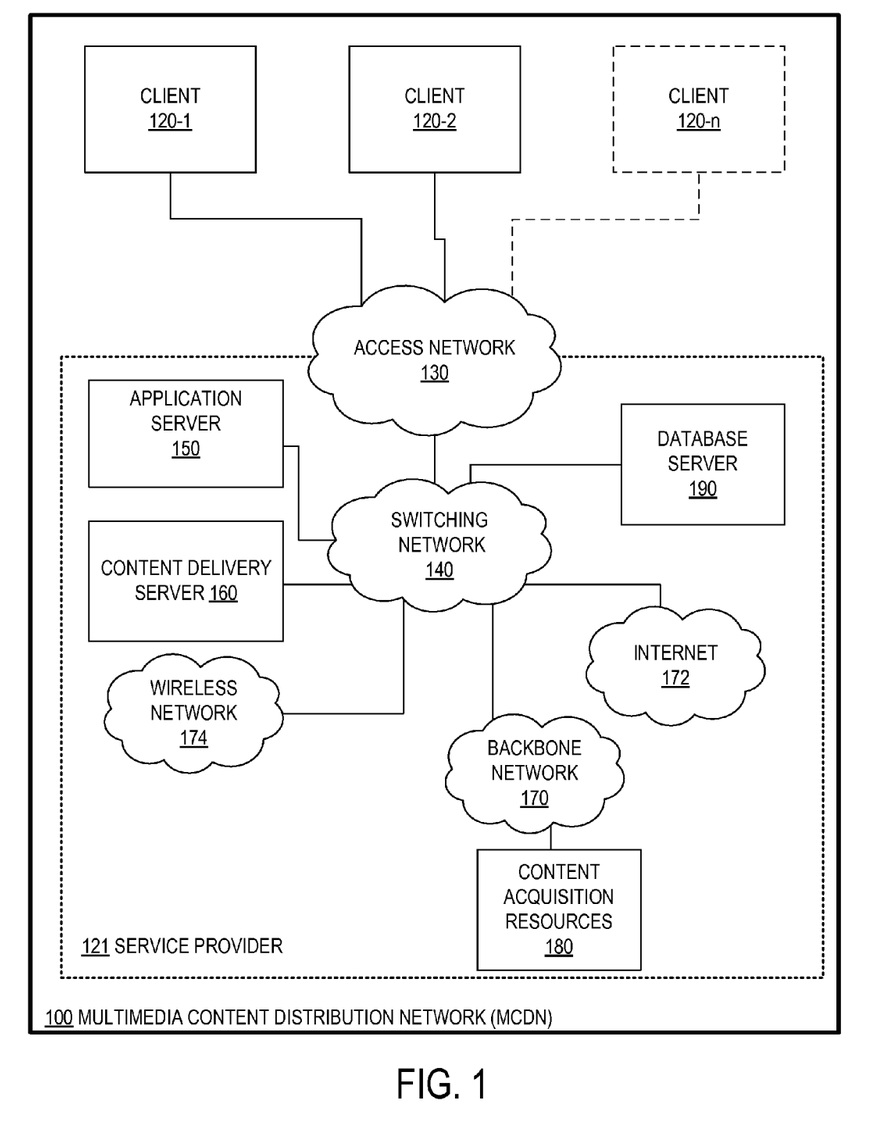
FIG. 1 is a block diagram of selected elements of an embodiment of multimedia content distribution network (MCDN)

Turning now to the drawings, FIG. 1 is a block diagram illustrating selected elements of an embodiment of an MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Clients 120 may include an intercom unit 322 (depicted in FIG. 3) and/or an MHD 125 for interactively monitoring client premises as discussed below. Service provider 121 as depicted in FIG. 1 encompasses resources to acquire, process, and deliver programs to clients 120 via access network 130. Such elements in FIG. 1 of service provider 121 include content acquisition resources 180 connected to aggregation and switching network 140, referred to herein simply as switching network 140, via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, a wireless cell data network such as WiMax, or a combination thereof. MCDN 100 may include digital connections between clients 120 and a node (see also FIG. 4) in access network 130 while fiber, cable, WiMax or another broadband medium connects service provider resources to the node. In other embodiments, the broadband cable may extend all the way to clients 120. In certain embodiments, fiber optic cables may be provided from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 170 (see also FIG. 4).

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operation support systems (OSS) resources.

FIG. 1 also illustrates application server 150 connected to switching network 140. As suggested by its name, application server 150 may host or otherwise implement one or more applications for MCDN 100. Application server 150 may, for example, host all or portions of an intercom application 724 (depicted in FIG. 7), which may be downloaded to an intercom unit or other client premises unit. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data storage. Database server 190 may communicate with other elements of the resources of service provider 121, such as application server 150 or content delivery server 160, in order to store and provide access to large volumes of data, information, or multimedia content. In some embodiments, database server 190 includes a data storage application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is wireless network 174, which may be coupled to switching network 140. Wireless network 174 may represent a wireless communications network for providing wireless service to a plurality of wireless user devices (not shown in FIG. 1). Wireless network 174 may accordingly represent an external network that is configured to operate autonomously to MCDN 100, but which may be coupled to MCDN 100. In certain embodiments, service provider 121 may own and/or operate both MCDN 100 and wireless network 174. It is further noted that access to wireless network 174 may be provided at client 120 via access network 130, as will be described in additional detail herein.

In FIG. 1, Internet 172 is representative of any public network accessible via switching network 140. Access to Internet 172 may encompass publication of websites, web pages, and web applications that may be invoked using a universal resource locator (URL), such as an Internet web address. A web browser or similar application may be used to access a published website using an Internet user device (not shown in FIG. 1). In certain implementations, application server 150 and/or database server 190 may be configured to host web servers (not shown in FIG. 1) accessible via Internet 172, whereby the web servers provide functionality for publishing websites and managing various URLs related thereto. It is noted that websites published using MCDN 100 may provide controlled access based on an MCDN client account associated with individual client 120. Client-specific websites may thus enable client-specific information and/or communication channels to be made available by MCDN 100 via Internet 172.

Figure 2:
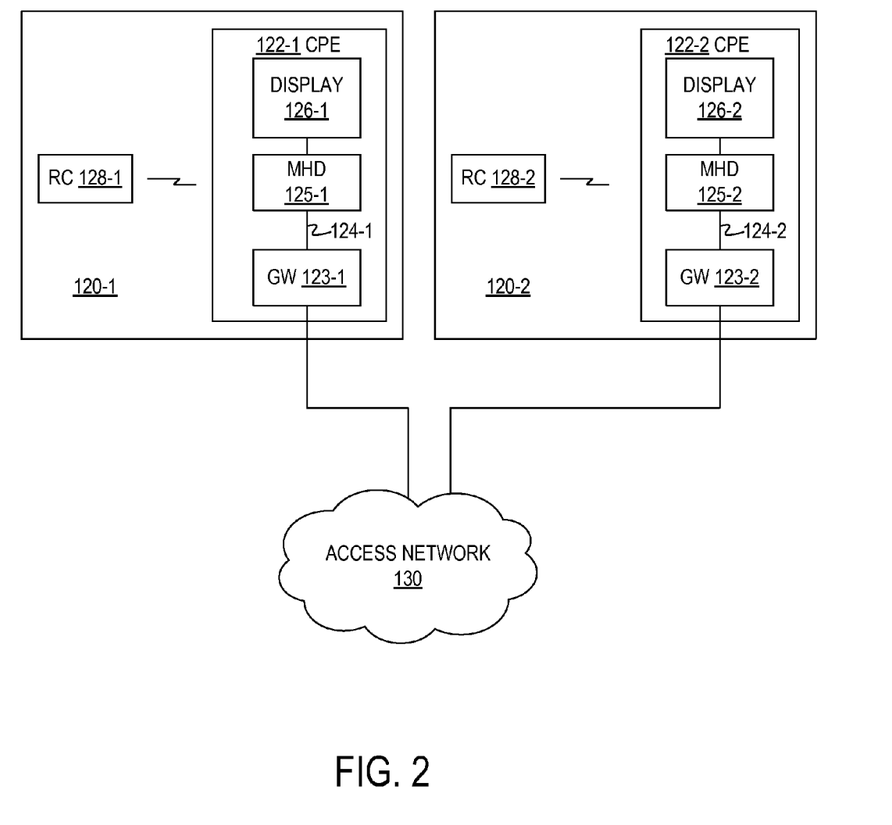
FIG. 2 is a block diagram of selected elements of an embodiment of an MCDN showing additional detail for the MCDN clients.

Turning now to FIG. 2, clients 120 are shown in additional detail with respect to access network 130. Clients 120 may include network appliances collectively referred to herein as customer premises equipment (CPE) 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device. In some embodiments, CPE 122 may also include an intercom unit such as the intercom unit 322 depicted in FIG. 3 and MHD 125 may include an intercom server module 324 and visitor profiles 326 depicted in FIG. 3.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a device that is configured to control multiple pieces of equipment. When the equipment controlled by remote control 128 changes, remote control 128 may be reprogrammed, for example, to add a new device. Remote control 128 may be programmed using a local transceiver (see FIG. 3) coupled to CPE 122.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based MCDN. As suggested above, CPE 122 and MHD 125 may implement interactive monitoring functionality as discussed in greater detail below.

Figure 3:
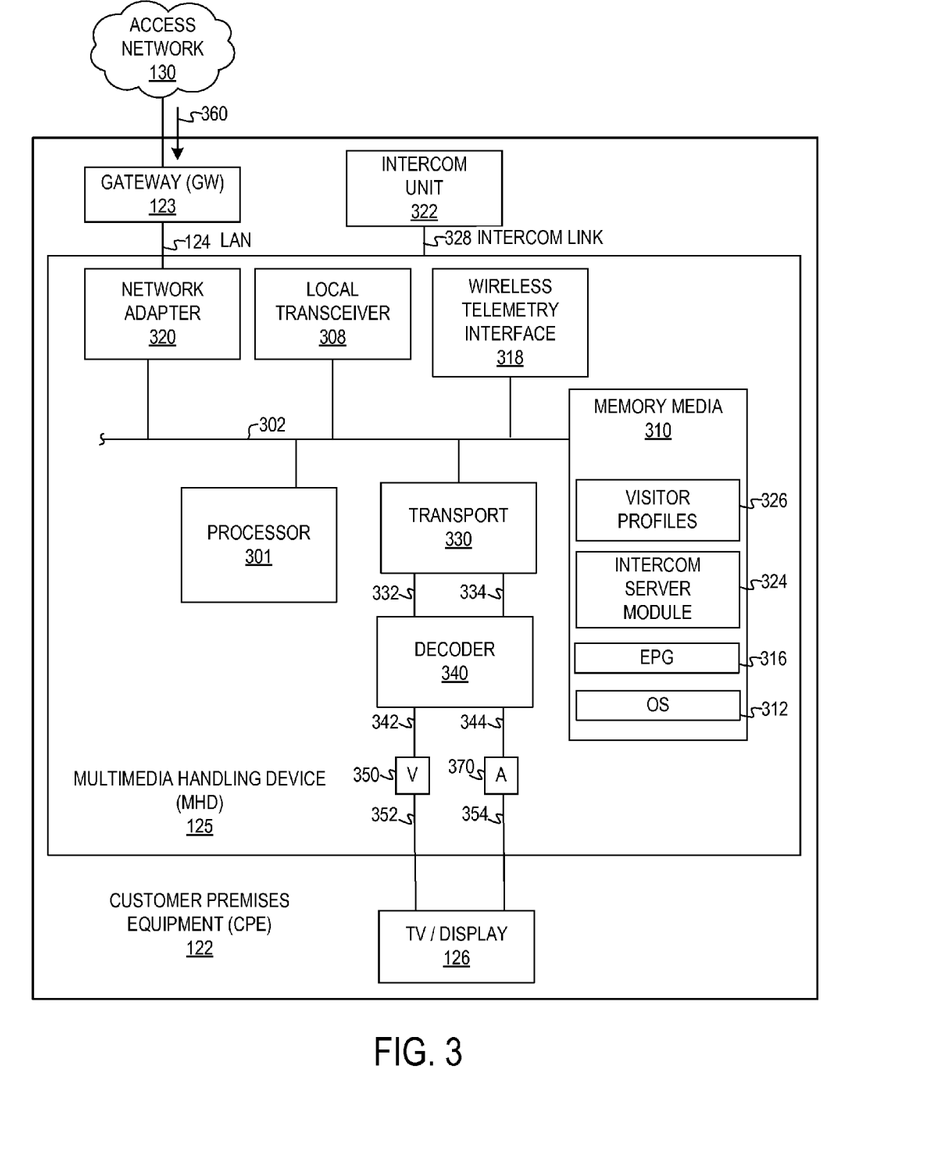
FIG. 3 is a block diagram of selected elements of an embodiment of a multimedia handling device (MHD)

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media, collectively identified as memory media 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a co-axial implementation, however, CPE 122 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information, and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly, decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125.

Memory media 310 encompasses persistent and volatile media, fixed and removable media, and magnetic and semiconductor media. Memory media 310 is operable to store instructions, data, or both. Memory media 310 as shown may include sets or sequences of instructions and/or data, namely, an operating system 312, EPG 316, visitor profiles 326, and intercom server module 324. Operating system 312 may be a UNIX or UNIX-like operating system, a Windows® family operating system, or another suitable operating system. In some embodiments, memory media 310 is configured to store and execute instructions provided as services to client 120 by application server 150, as mentioned previously.

EPG 316 represents a guide to the multimedia content provided to MHD 125 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2).

Visitor profiles 326 represent a collection of information about specific visitors to the premises of client 120. Visitor profiles 326 may be indexed using an identifier and/or an identity for each respective visitor. Visitor profiles 326 may include additional information, such as images, audio recordings, video recordings and other content associated with individual visitors. In addition, visitor profiles 326 may include configuration information usable for responding and/or interacting with respective visitors. In certain embodiments, a user of MHD 125 may provide the configuration information to configure MHD 125 and/or intercom unit 322 to respond with desired actions or functionality when a visitor is detected within a proximity of the premises of client 120. For example, MHD 125, in conjunction with intercom unite 322, may attempt to identify the visitor and/or initiate communication with or provide information to the visitor. It is noted that in certain embodiments, visitor profiles 326 may be configured to store configuration information using MCDN 100, for example, in conjunction with database server 190 (see FIG. 1).

Intercom server module 324 may represent an application for managing functionality and communication with a number of intercom units, such as intercom unit 322. In particular embodiments, intercom server module 324 may communicate via intercom link 328 with intercom client 734 (see FIG. 7) executing on intercom unit 322. Intercom server module 324 may also include interactive functionality, such as a user interface, for operation by a user of MHD 125. In some embodiments, intercom server module 324 may be configured to access visitor profiles 326 to save or retrieve user-specific and/or visitor-specific information in order to provide desired intercom functionality, as will be described in additional detail herein.

Local transceiver 308 represents an interface of MHD 125 for communicating with external devices, such as remote control 128, or another remote control device. Local transceiver 308 may provide a mechanical interface for coupling to an external device, such as a plug, socket, or other proximal adapter. In some cases, local transceiver 308 is a wireless transceiver, configured to send and receive infrared (IR) or radio frequency (RF) or other signals. In some implementations local transceiver 308 receives IR or RF signals, but does not transmit IR or RF signals, i.e., local transceiver 308 may be a receiver. Local transceiver 308 may be accessed by a remote control module (not shown in FIG. 3) for providing remote control functionality. In some embodiments, local transceiver 308 may include WiFi functionality.

Wireless telemetry interface 318 represents a wireless transceiver that may be configured to provide MHD 125 with voice and/or data communications. In particular embodiments, wireless telemetry interface 318 may be serviced by wireless network 174 (see FIGS. 1 and 4), such that MHD 125 is a wireless device of wireless network 174. It is noted that in certain embodiments wireless telemetry interface 318 may be implemented using an electronic device or component integrated within MHD 125. In other instances, wireless telemetry interface 318 may be an external device (not shown in FIG. 3), such as a cellular telephone or wireless communication device, that may be coupled to MHD 125 to provide connectivity with wireless network 174. Wireless telemetry interface 318 may further be configured for machine to machine (M2M) capability with corresponding systems and communication devices for a variety of applications. For example, M2M may be used by wireless telemetry interface 318 to monitor status information about the premises of client 120 and transmit the status information to a provider of home monitoring services, which may be the service provider 121 depicted in FIG. 1 or a third party service provider. MHD 125 may further rely upon the M2M capability of wireless telemetry interface 318 as an MCDN backup communication channel, for example, when GW 123 and/or access network 130 are unavailable. In some instances, wireless telemetry interface 318 may be enabled for push-to-talk (PTT) and/or push-to-talk over cellular (POC), in which wireless telemetry interface 318 switches between a voice reception mode and a transmit mode, e.g., by pushing or releasing a PTT button or other control (not depicted), thereby providing more immediate communication with a shorter connection time than, for example, a conventional cellular telephone connection.

Intercom unit 322 (see also FIG. 7), is depicted coupled to MHD 125 via intercom link 328. Intercom unit 322 may provide intercom functionality at the premises of client 120, including monitoring and reception of visitors, in conjunction with MHD 125, as will be described in further detail below. In various embodiments, intercom link 328 may represent a local communication link established using local transceiver 308, network adapter 320, shared bus 302, wireless telemetry interface 318, or another suitable interface (not shown in FIG. 3). In other words, intercom link 328 may represent a dedicated physical or logical network segment for communicating between MHD 125 and intercom unit 322 (see also FIG. 4). It is noted that intercom link 328 may represent a wireless or fixed communication link (including optical or galvanic connectors) or a combination thereof.

Figure 4:
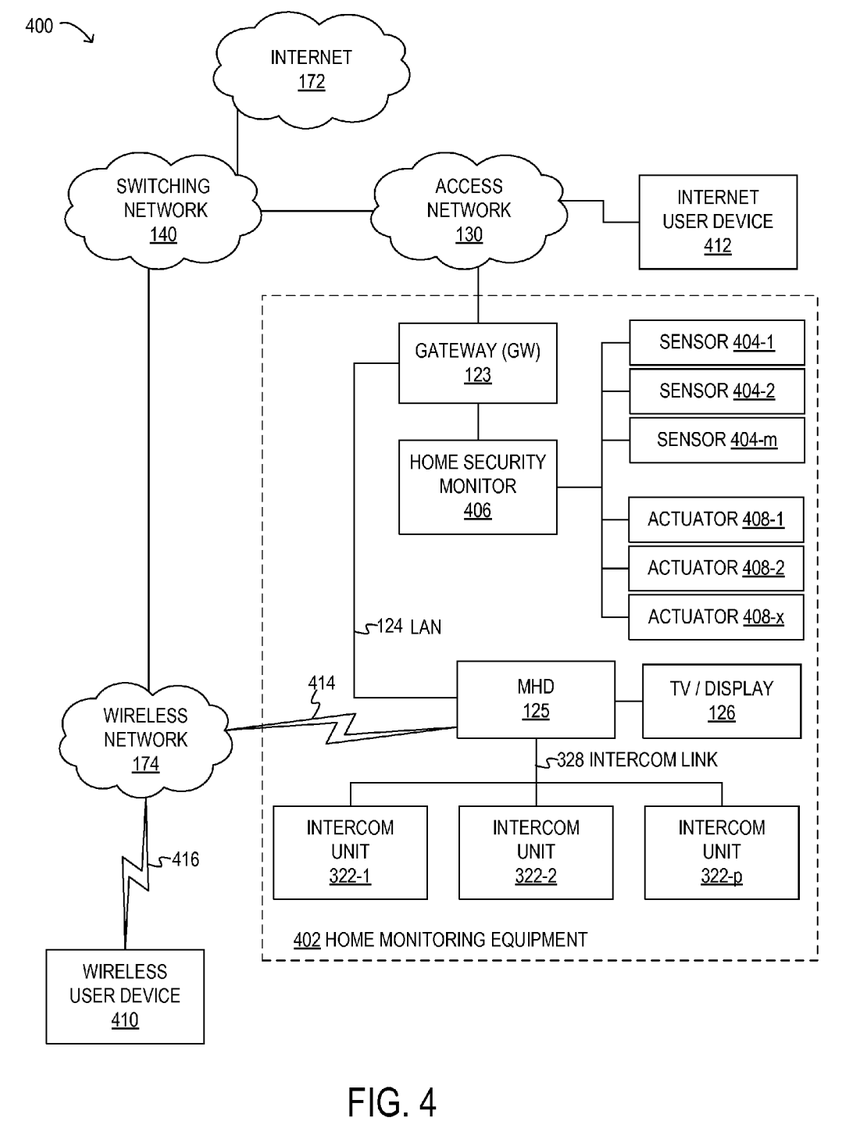
FIG. 4 is a block diagram of selected elements of an embodiment of a home monitoring system.

Turning now to FIG. 4, a block diagram of selected elements of an embodiment of home monitoring system 400 is depicted. It is noted that elements in FIG. 4 represent like-numbered elements discussed above with respect to FIGS. 1-3. Home monitoring system 400 may employ an exemplary architecture for interactive home monitoring in conjunction with an MCDN, as described herein. In various embodiments, certain elements in home monitoring system 400 may be omitted or rearranged to perform interactive home monitoring.

In FIG. 4, home monitoring system 400 is shown including home monitoring equipment 402, which may encompass certain elements of CPE 122 (see also FIG. 3). As shown in FIG. 4, MHD 125, display 126, GW 123 and LAN 124 may represent elements of CPE 122 that are configured for use with MCDN 100 (see FIGS. 1-3). Home monitoring equipment 402 may represent one or more components installed at the premises of client 120 for interactive home monitoring, as will be described in further detail below.

As shown in FIG. 4, home monitoring equipment 402 is shown including intercom link 328, which may provide connectivity among a number of intercom units 322 and MHD 125. Intercom link 328 may service one or more intercom units 322, such as intercom unit 322-1, intercom unit 322-2, and so on up to intercom unit 322-$p$, where p is an integer number of installed intercom units 322. In some embodiments, intercom units 322 may be installed at entry points or entrances of the premises of client 120. Intercom units 322 may be configured to communicate via MHD 125 or to communicate in a peer-to-peer fashion among themselves.

In the depicted embodiment of home monitoring system 400, MHD 125 may be configured to use LAN 124 as well as wireless link 414, which represents a wireless connection between wireless telemetry interface 318 (see FIG. 3) and wireless network 174. Via LAN 124 and/or GW 123, MHD 125 may be in communication with home security monitor 406, which may represent a dedicated controller for home security applications. Specifically, home security monitor 406 may be configured to control x number of actuators 408 and monitor m number of sensors 404, where x and m are integers. It is noted that home security monitor 406 may be configured to communicate with intercom server module 324 (see FIG. 3) executing on MHD 125 to receive commands and/or to provide status information describing sensors 404 and actuators 408. It is noted that home security monitor 406 and its associated sensors 404 and actuators 408 may represent a stand-alone system that is provided by an external service provider (not shown in the drawings). It is further noted that, in given embodiments, home security monitor 406 may represent various alternative architectures, such as a distributed architecture with multiple controllers, a segmented architecture covering different locations, or a redundant architecture with backup monitoring and control elements.

Actuators 408 may represent servo or mechanical actuators for controlling equipment at the premises of client 120. For example, actuator 408-1 may control (i.e., actuate) a door lock or a door lock release mechanism in response to a control signal (i.e., control command) generated by home security monitor 406. Similarly, actuator 408-1 may control a window opening or locking mechanism. Various other types of actuators 408 may be implemented. It is noted that home security monitor 406 may also be configured to receive or monitor a status for an actuator 408, which may enable home security monitor 406 to confirm that a desired or expected state of an actuator 408 has actually been attained after a control command has been sent. In certain instances, an actuator 408 itself includes an embedded controller capable of communicating with home security monitor 406.

In addition, home security monitor 406 may be configured to monitor sensors 404, which are installed at the premises of client 120. Sensors 404, may represent various types of transducers or measuring sensors. For example, sensor 404-1 may represent a window position sensor, while sensor 404-2 may represent a door closing sensor. Various types and configurations of sensors 404 may be used with home security monitor 406. In certain instances, a sensor 404 may be a so-called 'smart sensor' with internal data processing and communications capability.

Also in FIG. 4, access network 130, switching network 140, wireless network 174, and Internet 172 may represent elements of MCDN 100, as discussed previously (see also FIG. 1). Wireless network 174 may provide wireless service 416 to wireless user device 410, which may represent a mobile telephony device, such as a cellular telephone, smart phone, or other types of devices, such as media players, music players, or network access devices. Wireless user device 410 may also be a portable computer or a personal computer configured with wireless capability. Similarly, Internet user device 412 may represent a networked computing device operated by a user, for example, using a web browser. Accordingly, Internet user device 412 may be a personal computer, a portable computer, or another of various types of networked computing devices.

In operation of home monitoring system 400, a user of client 120 may operate MHD 125, wireless user device 410, and/or Internet user device 412, to configure intercom server module 324 for functionality to communicate with intercom unit 322. For example, a user may populate visitor profiles 326 with information about specific individuals and which actions to take when such individuals are detected as visitors to the premises of client 120. After configuration, home monitoring equipment 402 may detect a visitor in proximity of the premises of client 120. Specifically, a visitor may be detected approaching intercom unit 322-1, which may be used to interact with the visitor. In certain instances, an image of an arriving visitor may be compared with an image stored in visitor profiles 326. When a match is detected, home monitoring equipment 402 may set a visitor status to 'known' and may proceed to perform predetermined tasks. When no match is detected, home monitoring equipment 402 may set the visitor status to 'unknown' and store an image of the visitor for future reference, for example, in visitor profiles 326.

Intercom unit 322-1 may also perform various tasks to interact with a visitor. When the visitor status is known, intercom unit 322-1 may display or output a message intended for the visitor. The message may include a predetermined greeting or visitor-specific information. Depending on the visitor status, the visitor may be allowed to operate intercom unit 322-1 to obtain additional information or to leave a personalized message for the user. In certain embodiments, intercom unit 322-1 may establish a direct communication channel with the user, via wireless telemetry interface 318. The communication channel may be full-duplex or half-duplex in providing bidirectional communication. The user may thus be enabled to communicate using wireless user device 410 or Internet user device 412. It is noted that the user may be located at a remote location from the premises of client 120. When desired, the user may be provided with a real-time communication channel to intercom unit 322-1. For example, a PTT channel may be established via wireless network 174 between intercom unit 322-1 and wireless user device 410. The visitor may or may not be made aware of the user's location, for example, depending on the visitor status. The user may further be enabled to control home monitoring equipment 402 remotely while the visitor is interacting with intercom unit 322-1. For example, the user may sample an output of any of the sensors 404 or allow the visitor to enter the premises of client 120, by sending a command to home security monitor 406 to control a corresponding actuator 408.

In certain instances, the visitor may not be made aware that the user is monitoring the visitor's presence and/or activity. The visitor's identity and activity may be recorded by MHD 125 and the user may be enabled to review information recorded for all visitors over a given time period. In this manner, for example, the user may review visitor messages and/or visitor reports for the previous day, week or other period. It is noted that intercom server module 324 and/or application server 150 (see FIG. 1) may provide a user application for interactive home monitoring, as described herein, that is executable on wireless user device 410 and/or Internet user device 412.

In operation of home monitoring system 400, home monitoring equipment 402 may be configured to provide certain security features at the premises of client 120. For example, since MHD 125 may communicate with home security monitor 406, the user may be notified when a security breach is detected by home security monitor 406 via wireless network 174. In certain embodiments, MHD 125 may be configured to detect when access network 130 is unavailable and to use communication link 414 as a backup to communicate with MCDN 100 via switching network 140. In this manner, interactive home monitoring, along with other MCDN functionality, may remain operational during a situation when, for example, a connection to access network 130 has been innocently or maliciously interrupted. When sensor 404 and/or intercom unit 322 includes an imaging device, home monitoring equipment 402 may be configured to provide real-time images of the premises of client 120 to wireless user device 410. In this manner, remote surveillance functionality may be provided to the user, regardless of location.

In addition, home monitoring equipment 402 may record visitor activity and interaction with intercom units 322 and generate visitor reports for the MCDN user. The MCDN user may request a visitor report, for example using intercom server module 324, for a specified period of time, such as the previous day, week, month, etc. The visitor report for the specified period of time may be generated and may include identification information for visitors, along with indications of arrival times of respective visitors. The visitor report may also include, or provide access to, captured images of the visitors that have been stored. In this manner, the MCDN user may review all visitor activity recorded by home monitoring equipment 402.

It is further noted that additional functionality using home monitoring equipment 402 may be provided by executable code included in intercom server module 324. For example, intercom server module 324 may be configured to use wireless network 174 for a variety of functions, such as, but not limited to, notifying the MCDN user that the visitor was detected, sending an image of the visitor to the MCDN user, sending a visitor status to the MCDN user, communicating bidirectionally between the visitor and the MCDN user, communicating via audio, communicating via video, communicating via text, receiving instructions from the MCDN user for interfacing with the visitor, or combinations thereof. FIG. 4 thus depicts an implementation of home monitoring equipment for interactively monitoring a client premises in which MHD 125 may use a wireless telemetry interface as a backup network interface when access network 130 or other aspects of MCDN 100 are unavailable Turning now to FIG. 5, selected elements of an embodiment of a method 500 for interactive home monitoring are illustrated in flow chart form. In one embodiment, method 500 may be performed by intercom server module 324 (see FIG. 3) in conjunction with MCDN 100 and home monitoring system 400 (see FIGS. 1, 4). Method 500 may also involve functionality provided by intercom application 734 executing on intercom unit 322 (see FIGS. 3, 4, and 7). It is noted that certain operations described in method 500 may be optional or may be rearranged in different embodiments.

Figure 5:
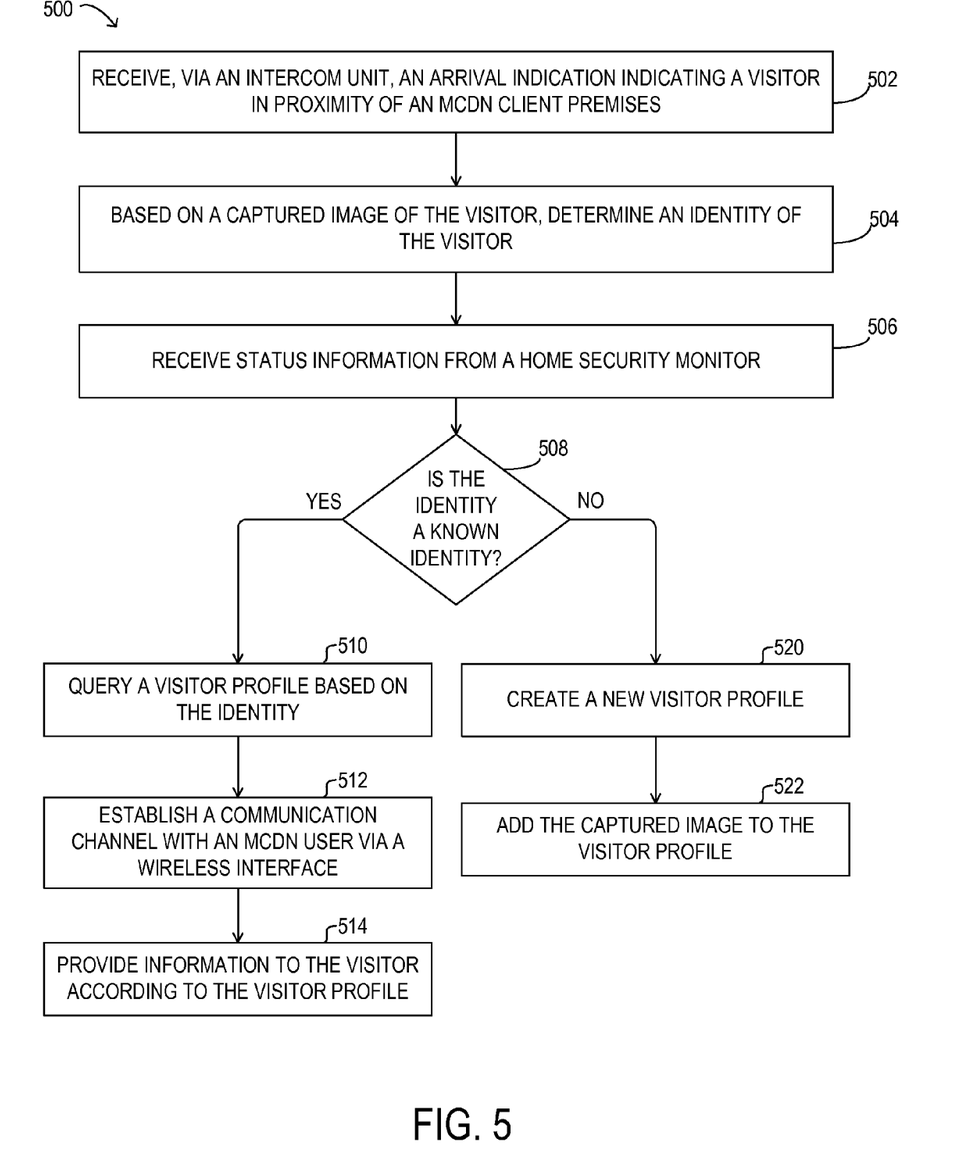
FIG. 5 illustrates selected elements of an embodiment of an interactive home monitoring method.

In method 500, an arrival indication indicating that a visitor is in proximity of an MCDN client premises may be received (operation 502), e.g., by MHD 125 from intercom unit 322. The arrival indication may be automatically generated without direct visitor input. In some embodiments, the arrival indication may be generated responsive to visitor input at the intercom unit. Based on a captured image or captured audio data of the visitor, an identity of the visitor may be determined (operation 504). The image may be captured by the intercom unit. The identity of the visitor may be determined using a biometric analysis of at least a portion of the image, such as a portion including a facial image of the visitor. Status information may be received (operation 506) from a home security monitor. The status information may indicate whether the MCDN client premises are in a secured or desired condition. A determination may then be made (operation 508) whether the identity is a known identity. The determination may be made by comparing known (i.e., previously stored) identity information with the identity of the visitor.

When the visitor identity is a known identity, then a visitor profile may be queried (operation 510) based on the identity. In some embodiments, operation 510 may be combined with operation 504. In this branch of method 500, it may be assumed that identity information, such as a visitor profile, has previously been stored for the visitor. As such, a communication channel may be established (operation 512) with an MCDN user via a wireless interface. The MCDN user may be a registered user of the MCDN client. The wireless interface may be configured to establish the communication channel with a wireless user device associated with the MCDN user, for example, using M2M capability. In certain embodiments, the communication channel may be a PTT channel. The MCDN user and the visitor may use the communication channel to communicate with each other via voice, image, video or a combination thereof. For example, the MCDN user may be shown an image of the visitor while engaging in a PTT interchange of voice messages with the visitor. The visitor may be shown an image of the MCDN user. Next, information may be provided (operation 514) to the visitor according to the visitor profile. The information may be provided in response to requests or selections made by the visitor using the intercom unit. The visitor profile may be used to determine the type of information or the type of access provided to the visitor. That is, the visitor profile may include configuration information provided by the MCDN user and specific to the visitor that constrains the functionality provided by the intercom unit to the visitor.

When the visitor identity is not known, then a new visitor profile may be created (operation 520). In this branch of method 500, it may be assumed that the visitor is a new visitor and that no visitor profile exists for the new visitor. The captured image may be identified, e.g., "Unknown visitor 0001", and added (operation 522) to the visitor profile. The captured image may be made available for comparing with captured images of future visitors that come into proximity of the MCDN client premises. Thus, FIG. 5 depicts a method for providing interactive monitoring at a client premises, where the method may include establishing, with a wireless interface of the MHD, a wireless bidirectional audio communication channel between the MHD and a mobile user device associated with an MCDN user of the client premises.

Figure 6:
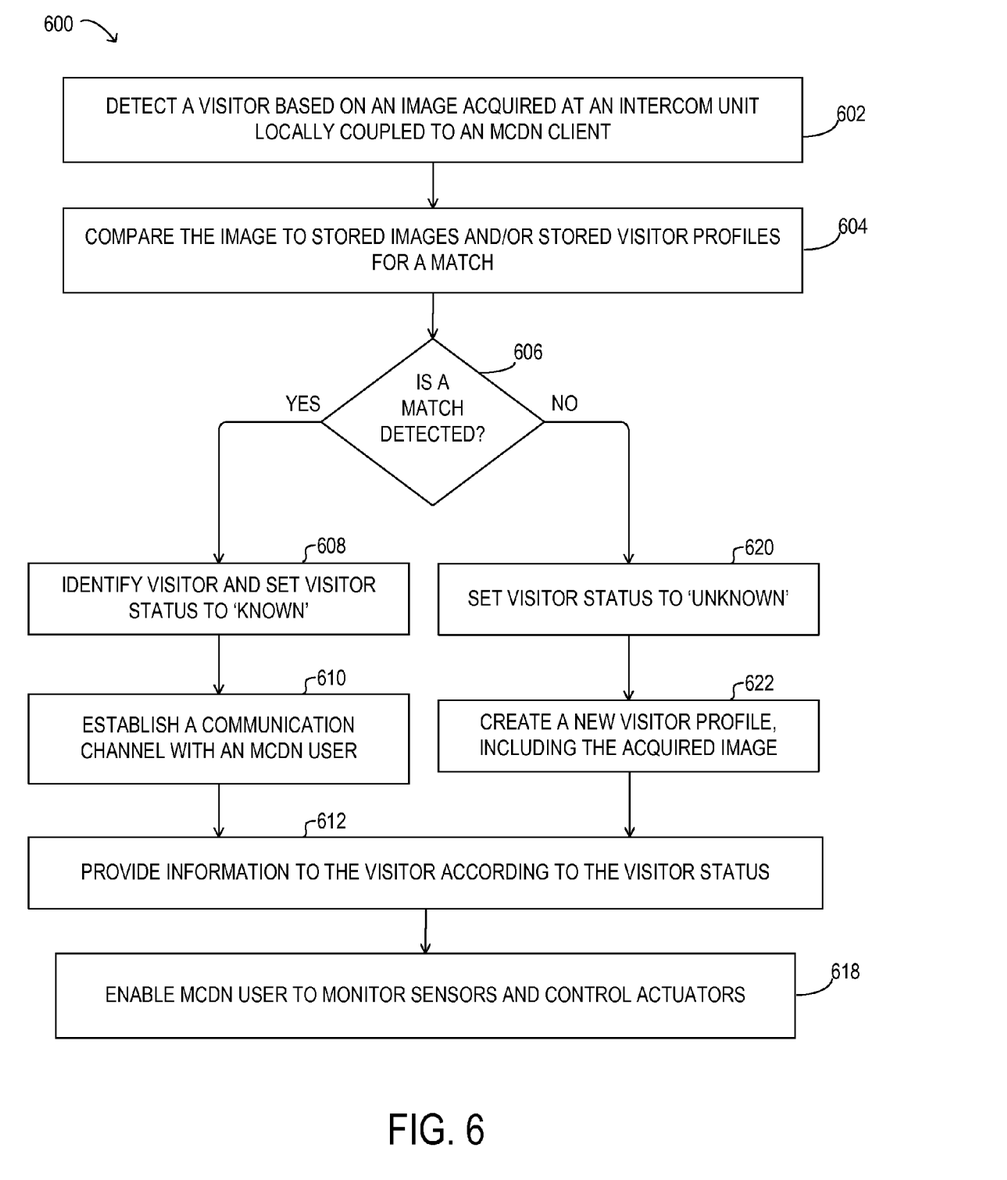
FIG. 6 illustrates selected elements of an embodiment of an interactive home monitoring method.

Turning now to FIG. 6, selected elements of an embodiment of method 600 for interactive home monitoring are illustrated in flow chart form. In one embodiment, method 600 may be performed by intercom server module 324 (see FIG. 3) in conjunction with MCDN 100 and home monitoring system 400 (see FIGS. 1, 4). Method 600 may also involve functionality provided by intercom application 734 executing on intercom unit 322 (see FIGS. 3, 4, and 7). It is noted that certain operations described in method 600 may be optional or may be rearranged in different embodiments.

In the depicted embodiment, method 600 detects (operation 602) a visitor based on an image acquired at an intercom unit locally coupled to an MCDN client. The image may be acquired by the intercom unit in response to the visitor coming in proximity of the MCDN client premises. The image may be sent to CPE 122 associated with MCDN client 120 via intercom link 328 (see FIGS. 3 and 4). The image may be compared (operation 604) to stored images and/or stored visitor profiles for a match. A determination may be made (operation 606) whether a match is detected.

If a match is detected, then the visitor may be identified and a visitor status may be set to 'known' (operation 608). A communication channel may be established (operation 610) with an MCDN user. The communication channel may include a wireless connection to the MCDN user, who may be located remotely from the MCDN client premises. The communication channel may be established to a network address associated with the MCDN user. In certain embodiments, the network address is a cellular telephone number registered to the MCDN user. The network address may also include an IP address, for example, for Internet user device 412 (see FIG. 4). Establishing the communication channel in operation 608 may further be dependent on configuration information associated with a visitor profile for the identified visitor. In one embodiment, for certain visitors having a known visitor status, operation 610 may be omitted according to predetermined preferences provided by the MCDN user.

If no match is detected in operation 606, then a visitor status may be set (operation 620) to 'unknown'. It is noted that certain additional operations (not shown in FIG. 6) may be implemented during interactive home monitoring for visitors having an unknown visitor status. For example, recordings of visitor actions or behavior may be stored when the visitor status is unknown. Next, a new visitor profile including the acquired image may be created (operation 622). The visitor profile may include an unknown or new visitor identity, which the MCDN user may subsequently access and modify or supplement. It is noted that in certain embodiments, the MCDN user may be notified in real-time of the presence of the unknown visitor (not shown in FIG. 6).

Irrespective of the outcome of operation 606, information may be provided (operation 612) to the visitor based on the visitor status. Different information or accessibility may be provided to the visitor at the intercom unit depending on the visitor status. For example, known visitors may be provided with prerecorded messages or communications from the MCDN user specifically intended for the visitor. In certain instances, an unknown visitor may be given an opportunity to identify themselves at the intercom unit, which may cause portions of method 600 to loop or repeat (not shown in FIG. 6). Method 600 may further enable (operation 618) the MCDN user may be enabled to monitor sensors and to control actuators. The sensors and actuators may be accessed via a home security monitor located at the MCDN client premises and coupled to CPE of the MCDN. Method 600 as depicted in FIG. 6 thus emphasizes the providing of information to the visitor and the enabling of the MCDN user to monitor sensors and control actuators whereas the method 500 depicted in FIG. 5 emphasizes the establishing of a communication channel with the MCDN user via a wireless interface.

Figure 7:
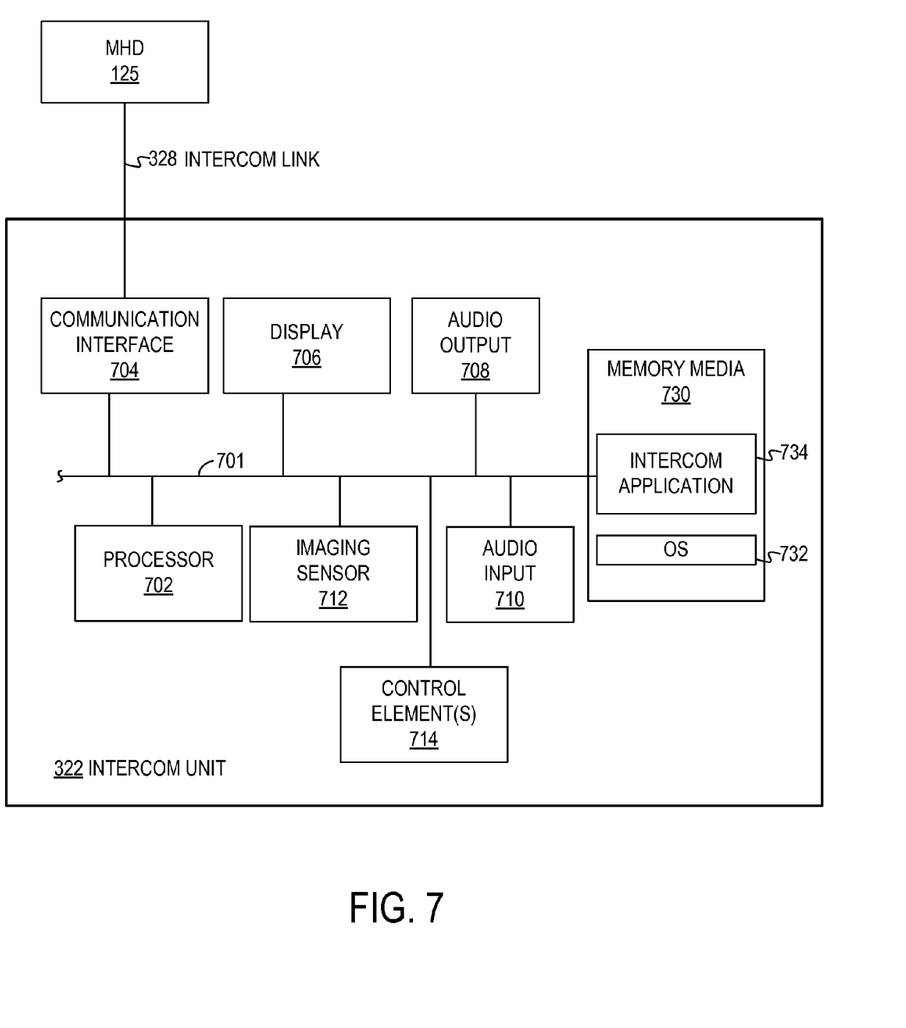
FIG. 7 is a block diagram of selected elements of an embodiment of an intercom unit.

Referring now to FIG. 7, a block diagram illustrating selected elements of an embodiment of intercom unit 322 is presented. Intercom unit 322 may represent an embedded device that is installed at an entry point to the premises of MCDN client 120. As shown in FIG. 4, multiple instances of intercom unit 322 may be configured for use at a given MCDN client premises. Intercom unit 322 may be installed in a manner that is amenable for viewing and/or operation by visitors to the MCDN client premises and may be coupled to MHD 125 via intercom link 328. In certain implementations, intercom unit 322 may be located at a considerable distance from MHD 125, for example, at an entry gate that is several hundred meters (or further) away from where CPE 122 is installed. The elements of intercom unit 322 depicted in FIG. 7 may be physically implemented as a single, self-contained device. In certain implementations, intercom unit 322 may alternatively be implemented using a number of different devices that are physically separated, but coupled together for centralized control. It is noted that intercom unit 322 may include additional components, such as a power supply and a cooling element, which have been omitted from FIG. 7 for clarity. As shown in FIG. 7, intercom unit 322 may operate in conjunction with MHD 125 (see also FIGS. 3 and 4) to execute the methods and operations described herein.

In the embodiment depicted in FIG. 7, intercom unit 322 includes a processor 702 coupled via shared bus 701 to storage media collectively identified as memory media 730. Intercom unit 322, as depicted in FIG. 7, further includes communication interface 704 that interfaces intercom unit 322 to MHD 125 via interface link 328, and through which intercom unit 322 may communicate with other elements of MCDN 100 (see FIG. 1) as well as with user devices, such as wireless user device 410 and Internet user device 412 (see FIG. 4). Also shown coupled to shared bus 701 are display 706, audio output 708, audio input 710, control elements 714, and imaging sensor 712. As described herein, intercom unit 322 may be configured to output multimedia content, including audio content, video content, images, text, or combinations thereof.

Display 706 may be implemented as a TV, a liquid crystal display screen, a computer monitor, or the like. Display 706 may comply with a display standard for computer monitors and/or television displays. Standards for computer monitors include analog standards such as VGA, XGA, etc., or digital standards such as DVI, HDMI, among others. A television display may comply with standards such as NTSC, PAL, or another suitable standard.

Audio output 708 may represent one or more speakers to play audio content and may, in certain instances, represent a set of speakers located at various locations. In this manner, audio output 708 may be configured to attain certain audio effects or a desired audio quality. Similarly, audio input 710 may represent a microphone or audio transducer for capturing audio input, including speech, provided by visitors and other users of intercom unit 322. Control elements 714 may represent physical or virtual controls, such as buttons, knobs, sliders, etc., that may be operated by visitors and other users of intercom unit 322. In particular embodiments, control elements 714 include virtual control elements displayed by display 706 and operable using a touch sensor, such as a touch screen or other tactile sensor. Accordingly, control elements 714 may represent static as well as dynamic controls that may be reconfigured for various input and output functions, as desired. Imaging sensor 712 may represent a camera for obtaining still and video imagery within a proximity of intercom unit 322. In various embodiments, intercom application 734 may be configured to acquire and process image data obtained using imaging sensor 712.

Memory media 730 encompasses persistent and volatile storage media, fixed and removable storage media, and magnetic and semiconductor storage media. Memory media 730 is operable to store instructions, data, or both. Memory media 730 as shown may include sets or sequences of instructions, including an operating system 732, and intercom application 734. Operating system 706 may be a UNIX or UNIX-like operating system, a Windows® family operating system, or another suitable operating system. Intercom application 734 may be configured to exchange instructions and data with intercom server module 324 (see FIG. 3) and to provide an interface for use by visitors to the MCDN client premises. Specifically, intercom application 734 may be configured to acquire images of visitors, output audio messages to visitors, receive audio messages from visitors, provide a graphical interface for display to visitors, receive commands and selections from visitors, and perform visitor-specific operations in conjunction with other elements in home monitoring equipment 402 (see FIG. 4). It is noted that intercom application 734 may execute certain methods and operations described herein, such as portions of method 500 (see FIG. 5) and/or method 600 (see FIG. 6), or other operations.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A home monitoring method, comprising:
responsive to receiving multimedia content corresponding to scheduled programming from an access network via a network adapter, processing the multimedia content to generate a native format audio signal and a native format video signal;
responsive to receiving an image and audio of a visitor from an intercom unit via a wireless telemetry interface, determining, based on the image received, a visitor status selected from:
known; and
unknown;
responsive to determining that the visitor status is known, retrieving a visitor profile for the visitor from a stored collection of visitor profiles;
responsive to determining that the visitor status is unknown, adding, to the collection of visitor profiles, a new visitor profile including the image and audio received and the visitor status;
generating, based on the visitor profile, a visitor prompt appropriate for the visitor status, wherein the visitor prompt indicates an identity of the visitor when the visitor status is known; and
establishing a communication connection between a network user and the visitor via the wireless telemetry interface.

2. The method of claim 1, further comprising:
detecting a request from the visitor for premises information; and
responsive to the request, outputting premises information via the intercom unit, based on the visitor status.

3. The method of claim 1, wherein the intercom unit is configured to output multimedia content, including at least one of: audio content, video content, images, and text.

4. The method of claim 1, wherein establishing the communication connection includes a cellular telephone connection.

5. The method of claim 1, wherein establishing the communication connection includes an Internet protocol connection.

6. The method of claim 1, further comprising:
using the communication connection to perform at least one of:
notifying the network user that the visitor was detected;
sending the image to the network user;
sending the visitor status to the network user;
communicating bidirectionally between the visitor and the network user;
communicating via audio;
communicating via video;
communicating via text; and
receiving instructions from the network user for interfacing with the visitor.

7. A premises device, comprising:
a processor;
a network adapter;
a wireless telemetry interface; and
a computer readable memory, accessible to the processor, including processor executable instructions, which, when executed by the processor, cause the processor to perform operations comprising:
responsive to receiving multimedia content corresponding to scheduled programming from an access network via the network adapter, processing the multimedia content to generate a native format audio signal and a native format video signal;
responsive to receiving an image and audio of a visitor from an intercom unit via the wireless telemetry interface, determining, based on the image received, a visitor status selected from:
known; and
unknown;
responsive to determining that the visitor status is known, retrieving a visitor profile for the visitor from a stored collection of visitor profiles;
responsive to determining that the visitor status is unknown, adding, to the collection of visitor profiles, a new visitor profile including the image and audio received and the visitor status;
generating, based on the visitor profile, a visitor prompt appropriate for the visitor status, wherein the visitor prompt indicates an identity of the visitor when the visitor status is known; and
establishing a communication connection between a network user and the visitor via the wireless telemetry interface.

8. The device of claim 7, wherein the wireless telemetry interface includes a cellular telephony interface and further wherein the cellular telephony interface is provided by a cellular telephone device coupled to the processor.

9. The device of claim 7, wherein the operations include:
receiving the multimedia content via the wireless telemetry interface responsive to detecting that content is unavailable from the access network via the network adapter.

10. The device of claim 7, wherein the intercom link includes at least one of: a wireless link, an optical link, and a wireline link.

11. The device of claim 7, further comprising:
a network connection to a home security monitor;
wherein the operations include:
receiving, from the home security monitor, sensor information from a security sensor installed at the premises; and
forwarding the sensor information to the network user.

12. The device of claim 11, wherein the operations include:
receiving, from the network user, control information to control an actuator installed at the premises;
forwarding the control information to the home security monitor;
receiving, from the home security monitor, actuator information indicating a state of the actuator; and
forwarding the actuator information to the network user.

13. A non-transitory computer readable medium, including processor executable instructions, which when executed by a processor, cause the processor to perform operations including:
responsive to receiving multimedia content corresponding to scheduled programming from an access network via a network adapter, processing the multimedia content to generate a native format audio signal and a native format video signal;
responsive to receiving an image and audio of a visitor from an intercom unit via a wireless telemetry interface, determining, based on the image received, a visitor status selected from:
known; and
unknown;
responsive to determining that the visitor status is known, retrieving a visitor profile for the visitor from a stored collection of visitor profiles;
responsive to determining that the visitor status is unknown, adding, to the collection of visitor profiles, a new visitor profile including the image and audio received and the visitor status;
generating, based on the visitor profile, a visitor prompt appropriate for the visitor status, wherein the visitor prompt indicates an identity of the visitor when the visitor status is known; and
establishing a communication connection between a network user and the visitor via the wireless telemetry interface.

14. The non-transitory computer readable medium of claim 13, wherein the operations include:
detecting a request from the visitor for premises information; and
responsive to the request, outputting premises information via the intercom unit, based on the visitor status.

15. The non-transitory computer readable medium of claim 13, wherein the intercom unit is configured to output multimedia content, including at least one of: audio content, video content, images, and text.

16. The non-transitory computer readable medium of claim 13, wherein establishing the communication connection includes a cellular telephone connection.

17. The non-transitory computer readable medium of claim 13, wherein establishing the communication connection includes an Internet protocol connection.

18. The non-transitory computer readable medium of claim 13, wherein the operations include:
performing, via the communication connection, at least one operation selected from:
notifying the network user that the visitor was detected;
sending the image to the network user;
sending the visitor status to the network user;
communicating bidirectionally between the visitor and the network user;
communicating via audio;

communicating via video;
communicating via text; and
receiving instructions from the network user for interfacing with the visitor.

* * * * *